United States Patent Office 3,221,146
Patented Nov. 30, 1965

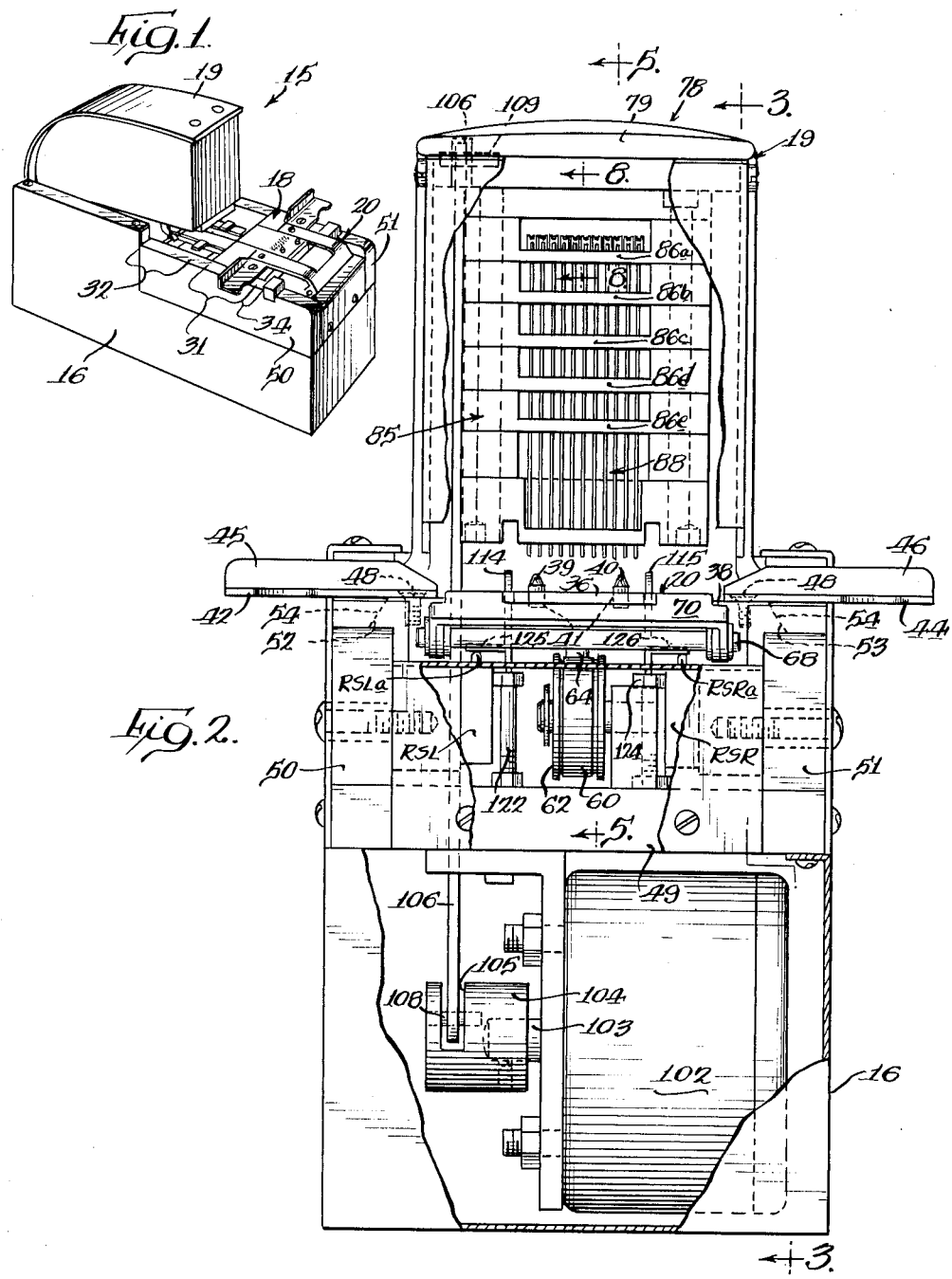

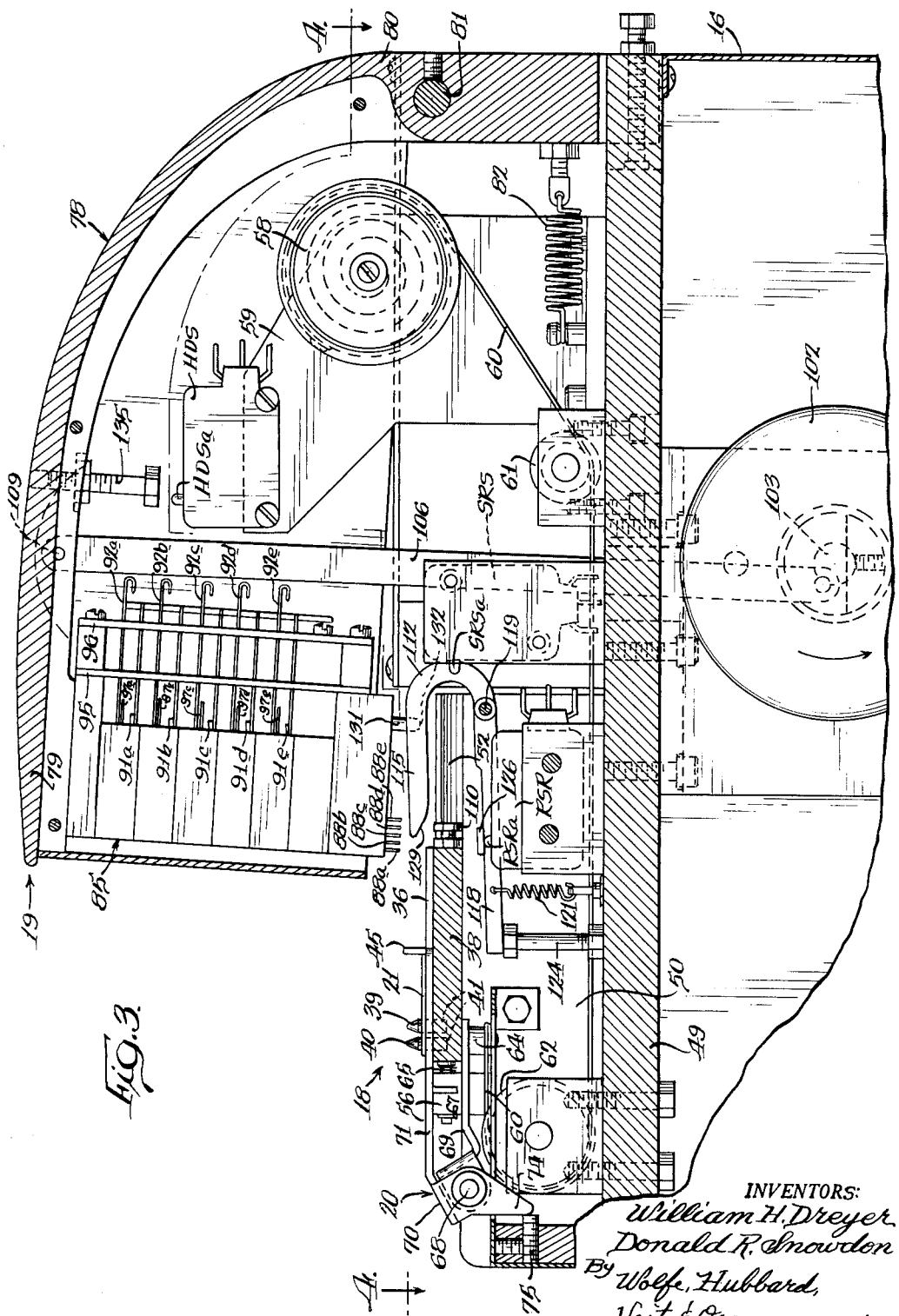

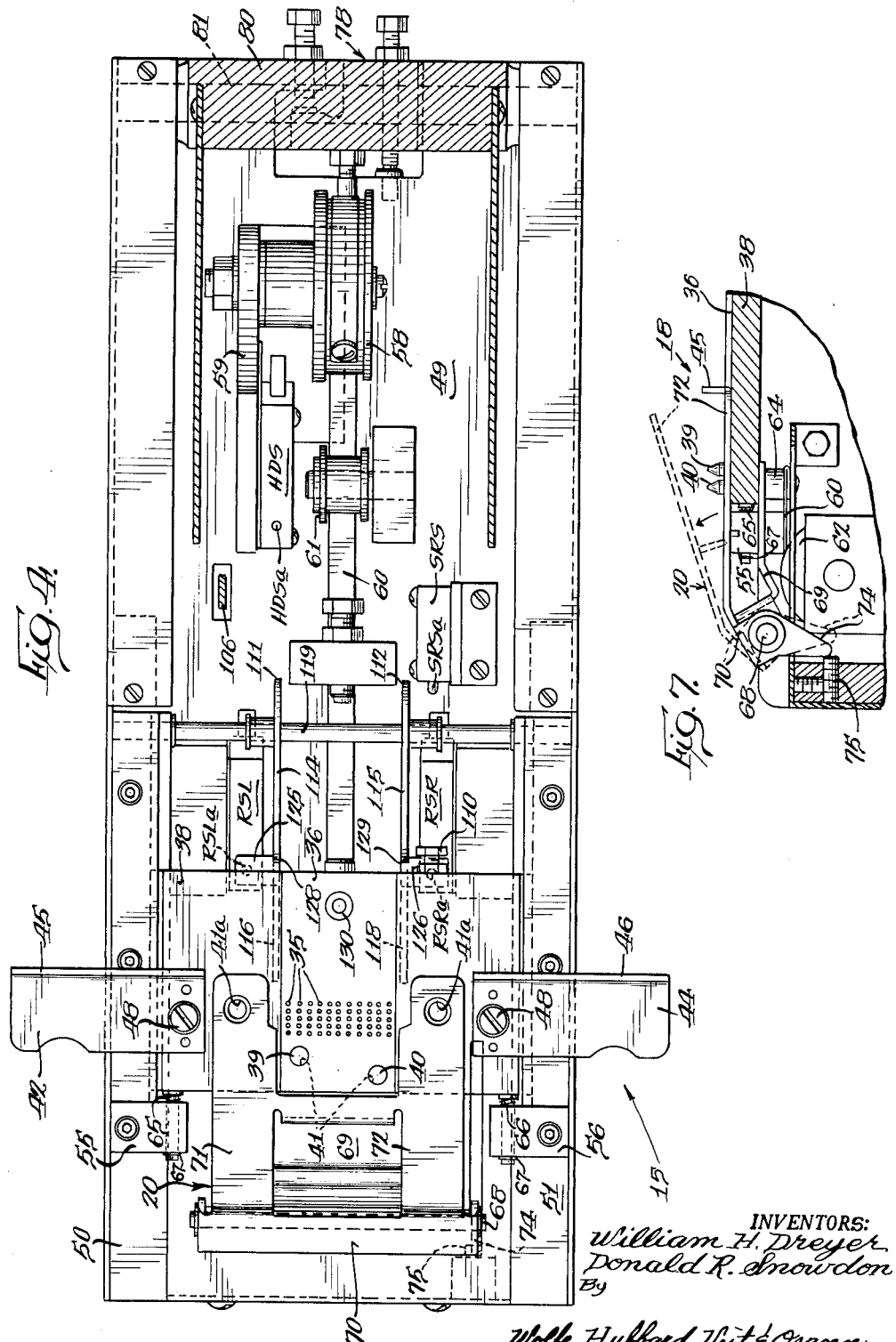

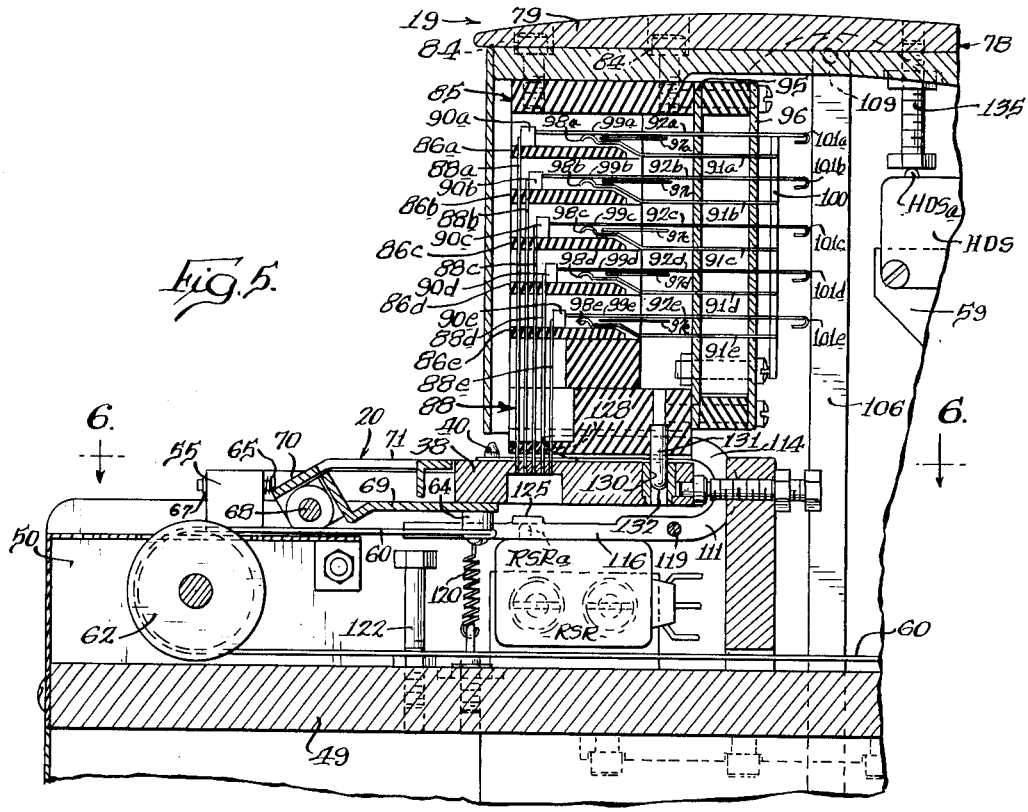
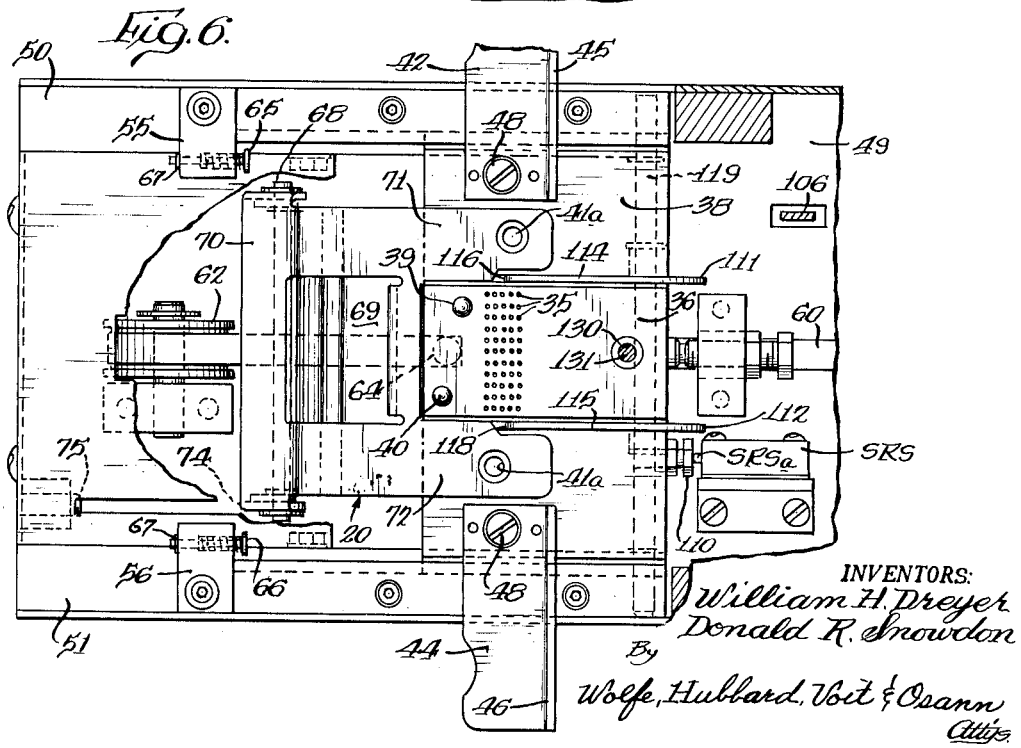

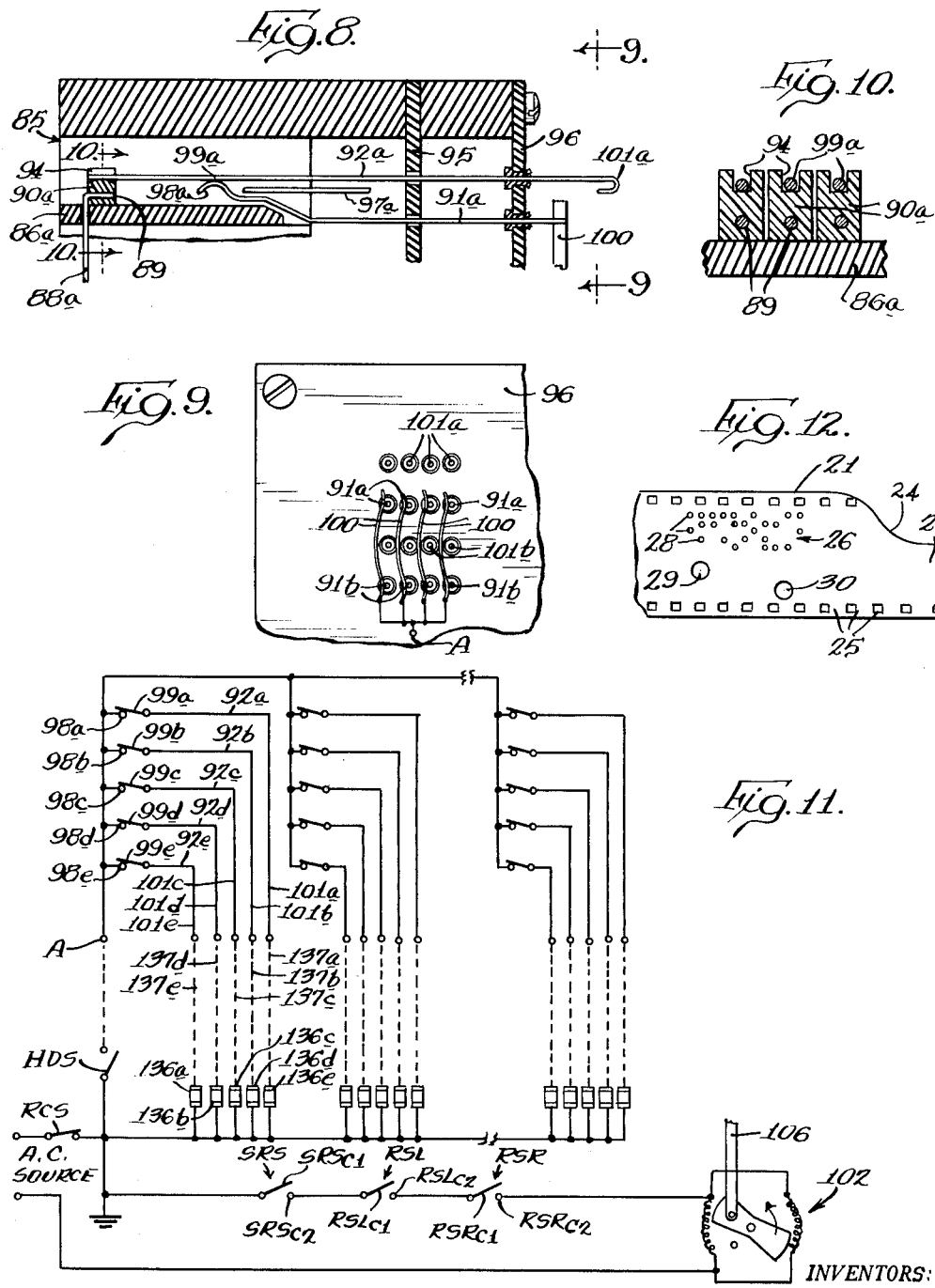

3,221,146
APPARATUS FOR READING CODED INDICIA IN
THE FORM OF PERFORATIONS
William H. Dreyer, Skokie, and Donald R. Snowdon,
Chicago, Ill., assignors to Cummins-Chicago Corp.,
Chicago, Ill., a corporation of Illinois
Filed May 20, 1960, Ser. No. 30,524
10 Claims. (Cl. 235—61.11)

The present invention relates to apparatus for sensing patterns of perforations in a film strip, record or document and, more particularly, to apparatus characterized by its ability to read and convert perforated, coded indicia formed on a film strip, record or document into signals acceptable by a data processor or the like.

In recent years there has been a widespread trend toward automation of business accounting systems. Efforts have been made to identify material, or to record accounting data and the like by coded indicia. The indicia is subsequently available for "reading" by mechanical or electrical input components of a data processor. It has been found that information can be directly applied to a document or a business record in the form of a plurality of perforations which are selectively disposed in a rectangular array. For example, various combinations of perforations may be selectively used in a five-place, in-line code to represent any of thirty-two characters. Hence, a 5 x 11 station rectangular array may be utilized to selectively record eleven characters on a document and, where the perforations are small in size, the entire rectangular field of perforations may take up an area of only about one-quarter of a square inch.

It is a general object of the invention to provide an improved apparatus for sensing the presence or absence of perforations selectively disposed in a predetermined array of stations. It is a related object of the invention to provide such perforation sensing apparatus in which the information sensed is converted into electrical signals for use by a data processor or the like.

More specifically, it is an object of the invention to provide a perforation sensing or "reading" apparatus of the above type characterized by its ability to sense perforations at stations which are very closely spaced.

Another object of the invention is to provide apparatus for sensing perforations in a record which is substantially automatic in operation in that the operator merely positions the record on a support and moves the support to a sensing area.

A related object of the invention is to provide means responsive to the position of the record support for automatically actuating a perforation sensing head.

It is a further object of the invention to provide perforation sensing and reading apparatus wherein the perforated record is normally urged towards the loading area, and in which the record and its support are latched in a sensing area during the sensing portion of the cycle. Upon completion of the sensing portion of the cycle, the record and support are released and automatically return to the loading area in condition to receive the next record without requiring any effort by the operator.

It is a further object of the invention to provide perforation sensing apparatus characterized by its ability to sense the presence or absence of a record on a record supporting slide and which is actuated only when a record is positioned thereon. A related object of the invention is to provide perforation sensing apparatus which assures proper orientation of the stations in the perforation field of a record and which can be actuated only when the record is properly oriented.

Still another object of the invention is to provide a perforation sensing apparatus wherein the perforated record is automatically ejected at the completion of a sensing cycle. More particularly stated, it is an object to provide for automatic ejection of a record as an incident to the return of the spring biased record support following "reading" of the record. It is a related object of the invention to provide perforation sensing apparatus capable of withstanding hard usage and which will be long lasting in operation by effecting cushioning of the record support during the ejection cycle so as to prevent damage resulting from the impact of the relatively movable parts.

These and other objects and advantages of the invention are attained by the construction and arrangement shown as an exemplary embodiment in the accompanying drawings, in which:

FIGURE 1 is a perspective view of a perforation sensing and reading apparatus embodying the features of the present invention;

FIG. 2 is a front elevation of the apparatus shown in FIG. 1 with a portion of the cover cut away and disclosing the sensing head in a non-sensing position;

FIG. 3 is a fragmentary section, taken substantially along the line 3—3 of FIG. 2, showing particularly the relationship between the slidable record support and the sensing head;

FIG. 4 is a plan view, taken partially in section substantially along the line 4—4 in FIG. 3, and illustrating the film-supporting slide mechanism positioned in the loading area, together with the means for urging the slide mechanism to the loading area;

FIG. 5 is a fragmentary sectional view taken substantially along the line 5—5 of FIG. 2, and showing particularly the arrangement of the sensing probes and switch contacts when the sensing head is in the sensing position;

FIG. 6 is a fragmentary plan view, taken partially in section along the line 6—6 in FIG. 5, and showing the film supporting slide assembly in the sensing area;

FIG. 7 is a fragmentary sectional view showing details of the ejector mechanism with the slide assembly positioned in the ejecting area;

FIG. 8 is a fragmentary section, taken substantially along the line 8—8 in FIG. 2, and showing particulary the disposition of one of the switches in the sensing head its corresponding sensing probe;

FIG. 9 is a fragmentary rear view, taken substantially along the line 9—9 in FIG. 8, and disclosing the jumper members employed for grounding one of the contacts in each of the plurality of switches;

FIG. 10 is a fragmentary sectional view taken substantially along the line 10—10 of FIG. 8, and showing the connection between one of the sensing probes and its corresponding resilient conductive switch element;

FIG. 11 is a schematic wiring diagram of the controls used in the perforation sensing and reading apparatus; and FIG. 12 is illustrative of a typical record having coded indicia applied thereto in a rectangular array of perforation stations.

While the invention has been illustrated and will be described in detail with reference to a preferred embodiment thereof, there is no intention that it thus be limited to such detail. On the contrary, it is intended here to cover such equivalent and alternative constructions which fall within the spirit and scope of the appended claims.

Referring first to FIG. 1, there is illlustrated a perforation sensing and reading apparatus 15 embodying the various features of the present invention and including a base 16, a record supporting slide assembly 18, a sensing head 19 which is pivotally mounted to the base 16, and an ejector mechanism 20.

While the invention is suitable for sensing and reading perforations formed in a variety of business documents or records, it is here illustrated and described with particularity for use with a film strip 21 which, for example, may be of the type shown in FIG. 12. The film strip 21 disclosed in FIG. 12 is a conventional 35 mm. film having a reduced leader 22 formed by a curved radius 24. The film strip 21 is provided with sprocket holes 25 and has encoded thereon identifying indicia in the form of a perforation field 26 which, for example, might include billing information, addresses, or the like. A typical perforation field generally includes a plurality of perforations 28 which are selectively formed in a rectangular array. In the illustrative case, the field 26 is made up of fifty-five stations arranged in eleven columns and five rows. Each station, represented by the intersection of imaginary vertical and horizontal lines, may be blank or may have a perforation formed therein, the particular combination of perforations in each column representing a particular character according to a predetermined code. The particular code employed and the meaning of the various characters represented by the perforations in the eleven columns is not necessary to an understanding of the invention, and hence the description will not be unduly lengthened by such details.

It is important to note however, that the perforation stations in the field 26 of the film strip 21 are in the present instance spaced apart .087 inch center-to-center in each horizontal row, .062 inch center-to-center in each vertical column, and that each perforation has a diameter of .041 inch. It will therefore be apparent that the area covered by the field 26 is quite small, about one quarter of a square inch, although the coded indicia represented thereby may include all of the information necessary to the processing, delivering and billing pertaining to the particular film strip in question.

At the time the perforation field 26 is formed in the film strip 21, a pair of locator holes 29, 30 are also formed therein. The locator holes 29, 30 are considerably larger in diameter than are the perforations 28 in order that they may accommodate locating means, to be subsequently described in greater detail, for properly orienting the film strip 21 with respect to the sensing head 19.

In order to more fully understand how a particular perforation field is formed in a film strip and some of the more detailed uses to which it may be put, attention is directed to a co-pending application of William H. Dreyer and Heinz W. Schreiter, for Apparatus for Sensing and Reproducing Perforations, Serial No. 840,111, now Patent No. 3,049,286, filed September 15, 1959, by and assigned to the assignee of the present invention.

To facilitate a preliminary understanding of the perforation sensing and reading apparatus 15 (FIG. 1), a typical operating cycle will be briefly reviewed.

At the start of a cycle the slide assembly 18 rests in in loading area 31 at the right end of the machine as viewed in FIG. 1. The slide assembly is resiliently urged towards the loading area 31 so that it tends to automatically return to the loading area after the sensing cycle. The operator orients the film strip 21 on the slide assembly (as shown in FIG. 3) and moves the slide over the base 16 towards the left (as viewed in FIG. 1) until it is positioned in a sensing area 32 located beneath the sensing head 19. The sensing head 19 is actuated when the slide assembly enters the sensing area 32. As the sensing head 19 moves toward the slide assembly 18 the two elements are coupled together so as to lock the slide assembly in the sensing area 32. Upon completion of the sensing portion of the cycle, the sensing head moves away from the slide assembly, thus releasing the slide assembly and enabling the slide to be urged to the right (as viewed in FIG. 1) and towards the loading area 31. During the return movement of the slide assembly, inertial forces cause a limited amount of over-travel thereof, thus moving the slide momentarily into an ejection area 34. During the limited, momentary over-travel, the film strip 21 (FIG. 3) is automatically stripped from the slide assembly, at which time the slide assembly is returned to the loading area ready for the next cycle.

To permit sensing or "reading" of the perforation field 26, the film strip 21 is oriented above a plurality of stations in the form of openings 35 (see FIG. 4) formed in a raised central portion 36 of a film support plate 38. The plate 38 is secured to and forms a part of the slide assembly 18 so that the portion 36 is disposed beneath the sensing head 19 when the slide is positioned in the sensing area 32. The openings 35 are disposed in a rectangular array corresponding to the perforation field 26 used to code the records being read.

For properly orienting the strip 21 on the plate 38, a pair of upstanding locator lugs 39, 40 (FIGS. 3 and 4) are mounted in openings 41 formed in the upper surface of plate 38. To aid in placing the strip, a pair of record support wings 42, 44 having upwardly extending flanges 45, 46 respectively, are rigidly secured to the upper surface of the support plate 38 by screws 48, and extend laterally out from the sides of the slide assembly. The upwardly extending flanges 45, 46 serve as a stop or guide against which the strip can be held to aid in fitting the strip on the lugs 39, 40.

As best illustrated in FIG. 4, the locator lug 39 is positioned somewhat further from the front end of the apparatus 15 (or closer to the flanges 45, 46) than is the locator lug 40. Thus, it can be appreciated that the positioning of the flanges 45 and 46 taken in conjunction with the slightly staggered disposition of the locator lugs 39, 40 makes it impossible for the operator to position the film strip 21 on the slide assembly backwards, thereby insuring that the perforation field 26 in the film strip is properly oriented with respect to the openings 35 in the film support plate. The raised central portion 36 of record support plate 38 together with the laterally extending wings 42, 44 cooperate to define a substantially flush supporting surface for the perforated film or record 21.

While the description which has proceeded heretofore has been primarily directed to a particular type record, i.e., the 35 mm. film strip 21, it will be obvious to those skilled in the art that the invention is equally applicable for use with other size records, for example, 16 mm. film strips or various perforated business documents.

In order to accommodate records of other sizes, there is provided a second set of locator openings 41a (FIG. 4) in the plate 38. In the illustrated device, openings 41a are positioned within the width of a 16 mm. film strip from the flanges 45, 46 so that by shifting the lugs 39, 40 from the openings 41 to the openings 41a, a 16 mm. strip having properly located alinement holes can be positively oriented on the plate 38. It will be apparent that any number of sets of openings for the lugs 39, 40 may be formed in the support plate 38 to correspond with the situs of locator holes in any desired type of record.

In order to mount the slide assembly 18 on the base 16 for translation from the loading area 31 to the sensing area 32, and thence to the ejection area 34 (FIG. 1), the base is provided with a horizontally disposed carrier plate 49 extending the full length of the apparatus as best shown by reference to FIGS. 1, 3 and 4 conjointly. Upstanding side walls 50, 51 are rigidly secured to the carrier plate 49 and extend rearwardly from the front end of the apparatus 15. The internal surfaces of the upstanding side walls 50, 51 are provided with rearwardly extending, horizontally disposed, V-shaped grooves 52, 53 (FIG. 1), respectively. While the grooves 52, 53 may be formed by machining the side walls, the illustrative embodiment contemplates rigidly securing a rearwardly extending member having an internal tapered face to each of the side walls. The support plate 38 has laterally tapered edges 54 which snugly fit within the rearwardly extending grooves 52, 53, the grooves thus serving as a track within which the support plate rides. Stops 55, 56 (FIG. 4) are rigidly secured to the side walls 50, 51 respectively, to provide abutments limiting the forward movement of the slide assembly 18.

For normally urging the slide assembly 18 towards the loading area 31, a "clock spring" 58 (FIGS. 3 and 4) is rigidly anchored on a bracket 59 that is secured to the carrier plate 49. A ribbon 60 formed of nylon or the like is connected to the free end of the spring 58 and extends forwardly beneath a pair of pulleys 61, 62 (FIG. 3) which are rigidly secured to the carrier plate 49. The opposite end of the ribbon 60 is connected to the record support plate 38 by being secured to a depending lug 64 formed on the plate 38. The pulleys 61, 62 are journaled on the carrier plate 49 with the pulley 62 being forward of the slide assembly. The arrangement is such that when slide assembly 18 is manually moved rearwardly, to the right as seen in FIG. 3, so as to be positioned under the sensing head 19, the clock spring 58 is wound up. Thus, when the slide assembly is released, clock spring 58 rewinds the ribbon 60 and pulls the slide assembly 18 back towards the stops 55 and 56 (FIGS. 3 and 4).

To cushion the impact between the slide assembly 18 and the stops 55, 56 and to permit a limited amount of over-travel as the slide assembly is urged from the sensing area by the spring 58, the stops 55, 56 present to the slide assembly spring biased plungers 65, 66 respectively (FIGS. 4 and 6), having shank portions which extend through their respective stops and are retained therein by snap rings 67 or the like. When the slide assembly is released from the sensing area 32 (FIG. 1), it moves rapidly towards the stops 55, 56 and under the influence of clock spring 58.

The slide assembly strikes the plungers 65, 66 driving them into the stops 55, 56 until the inertial force exerted by the returning assembly is absorbed. The plungers then urge the slide assembly from the stops until the force of the spring biased plungers is balanced by the force of the spring 58. The loading area 31 (FIG. 1) is thus defined by the point of equilibrium assumed by the slide assembly under the influence of the opposing forces exerted by the clock spring 58 and the plungers 65, 66, while the ejection area 34 (FIG. 1) is defined by the displacement of the plungers 65, 66 as they absorb the inertia of the slide assembly 18.

To provide for automatic stripping of the perforated film 21 from locating lugs 39, 40, the ejector mechanism 20 is actuated as the slide assembly moves through the loading area into the ejecting area. In the particular device illustrated, the mechanism 20 includes a shaft 68 rigidly mounted on a bracket 69 secured to the support plate 38 (FIGS. 5, 6 and 7). An ejector plate 70 having a pair of rearwardly extending stripper arms 71, 72 (FIG. 6) is pivotally mounted on the shaft 68 and positioned so that the stripper arms 71, 72 normally rest upon the support plate 38 between the raised portion 36 of the plate and the laterally extending wings 42, 44 respectively. Thus, a perforated film or record mounted upon the slide assembly 18 will rest not only on the raised portion 36 of the support plate 38 and on the lateral wings 42, 44, but it also overlies the rearwardly extending stripper arms 71, 72.

The ejector plate 70 is provided with a downwardly depending lug 74 (FIG. 7) positioned to abut a stop 75 rigidly mounted on the carrier plate 49 when the slide assembly 18 is in the loading area 31. Hence, when the slide assembly 18 moves forwardly under the influence of the clock spring 58, the lug 74 engages the stop 75 as the assembly 18 passes through the loading area. Further movement of the slide assembly 18 into the ejection area 34 causes the ejector plate 70 and stripper arms 71, 72 to pivot about shaft 68 to the broken line position shown in FIG. 7 since lug 74 is in engagement with fixed stop 75. As the arms 71, 72 pivot upwardly, they engage the under surface of the perforated record and strip it from the locating lugs 39, 40. Upon return of the slide assembly to the loading area, the lug 74 moves away from the stop 75 and the arms 71, 72 drop down to their normal solid line position shown in FIG. 7 as substantially flush with the portion 36 of the plate 38.

In carrying out the present invention, there is provided a particularly compact sensing arrangement for operating individual electrical contact pairs, or switches, in response to the presence or absence of a perforation at each of the stations in the perforating field 26 of the record. To this end, sensing head 19 includes a support member 78 (FIGS. 3 and 5) which is pivotally mounted to the base 16 at the rear of the machine. The support member 78 is curved so as to provide a substantially horizontally disposed portion 79 positioned over the sensing area 32 and a substantially vertically disposed portion 80 which is pivotally mounted on a shaft 81 (FIG. 3) secured to the base 16. The lowermost extremity of the vertical portion 80 of the support member 78 is positioned substantially beneath the pivot point defined by the shaft 81 and has connected thereto one end of a spring 82, the other end of which is rigidly connected to carrier plate 49. It will be apparent therefore, that spring 82 tends to urge the support member 78 in a clockwise direction, thus urging the substantially horizontally disposed portion 79 thereof upwardly and away from the sensing area 32.

Mounted on the horizontal portion 79 of the sensing head support member 78 is a compact assembly 85 of electrical contact pairs which define a switch for each possible perforation in the field 26. In the preferred construction as best shown in FIG. 5, the assembly 85 includes a plurality of rigidly mounted transverse plates 86a to 86e formed of dielectric material and which define a plurality of spaced shelves. In the illustrated embodiment, five transverse plates, and thus five shelves, are provided.

To form cooperating switch contact pairs, a plurality of fixed conductive members 91 and a plurality of movable conductive members 92 are disposed adjacent each of the shelf-defining plates 86a–86e. For convenience, the members 91, 92 adjacent the plates 86a to 86e, have been designated 91a to 91e, and 92a to 92e, respectively. The conductive members 91, 92 are anchored in spaced plates 95 and 96 (FIGS. 5 and 8), forming parts of the assembly 85, so as to extend parallel to their adjacent respective shelves. Each member 91 cooperates with a member 92 to form a switch contact pair. Preferably, each of the members 91, 92 is formed of conductive resilient spring wire with the fixed members 91 being of approximately the same length. The movable conductive members 92 are of progressively varying lengths with the members 92a adjacent the plate 86a being the longest, for a purpose to be made clear below. A plurality of transversely disposed stops 97a–97e made of an insulating material are rigidly secured to the assembly 85 with each stop being interposed between its respective contact pair 91a, 92a–91e, 92e. Each of the fixed resilient conductive members 91a–92e is positioned to abut its respective stop 97a–97e but is normally urged away therefrom by the paired movable conductive member 92a–92e. Thus, upon actuation of any of the contact pairs, the fixed resilient members 91 move with the movable members 92 with a wiping action until the fixed members abut their respective stops, further movement of the movable members serving to open the respective contact pairs. The resultant wiping action insures that the contact surfaces are kept clean, thereby providing a good electrical contact.

In the exemplary apparatus 15, all of the switch contact pairs are normally closed and therefore the fixed members 91 and movable members 92 are mounted so as to have normally engaging portions 98 and 99 respectively, which form normally closed switch contacts. Again with reference to the particular wiring arrangement illustrated, the fixed members 91 are coupled by jumpers 100 (see FIGS. 8 and 9) leading to a common terminal A, while each of the movable members 92 are formed with pigtails 101a–101e adapted to be coupled to the data receiving device with which the apparatus 15 is utilized.

To operate the contact pairs formed by the cooperating members 91, 92, a plurality of rows of probes 88 are slidably mounted in the assembly 85 transversely of the shelves formed by the plates 86a–86e (FIGS. 3 and 5). One row of probes is provided for each of the contact pairs disposed adjacent one of the shelf-defining plates. In the illustrated construction, eleven fixed members 91 and eleven movable members 92 are disposed adjacent each of the plates 86a–86e and hence eleven rows of probes 88 (FIG. 2) are slidably mounted in the assembly. Since each row of probes 88 is identical, only one, for convenience that shown in FIG. 5, will be discussed in detail.

The probes in each row have ends disposed adjacent different ones of each of the shelf-defining plates 86a–86e and since five plates are provided, five probes 88a–88e are included in each row with the ends of the probes 88a–88e being disposed adjacent the plates 86a–86e respectively. The end of each of the probes 88a–88e is coupled to the movable conductive member 92 located adjacent the respective shelf-defining plate. The longest probe 88a is coupled to the longest movable member 92a and the couplings between the successive probes 88b–88e and the corresponding movable member 92b–92e are staggered so as to maintain the parallel relationship between the probes and between the conductive members.

In the preferred construction, the probe ends are coupled to the corresponding movable conductive members through blocks 90a–90e which are secured to lips 89 formed on the respective probes and which are provided with grooves 94 that carry the associated movable conductive member. The blocks 90 are formed of dielectric material so as to insulate the probes from the electrical contact pairs.

The opposite ends of the probes 88, that is the ends not coupled to a conductive member, are disposed in a common sensing plane that overlies the openings 35 when the slide assembly 18 is in the sensing area 32. In operation, downward movement of the support member 78 causes relative movement between the record 21 and the probes 88, with the sensing plane of the probes being moved through the record. Those probes which find no perforation in the record strip are halted and moved relative to the assembly 85 so as to shift the coupled conductive member 92 and operate the associate contact pair. In the illustrated embodiment, this results in opening of the normally closed contact portions 98, 99. As a result, only those contact pairs which correspond to perforations in the record remain closed during the sensing operation of the apparatus 15.

While the invention has been described in connection with a sensing head having a plurality of normally closed switch contacts, one skilled in the art will appreciate that the invention is not necessarily so limited and that the contact pairs could be normally open if desired, with selective relative longitudinal movement between certain of the probes and the sensing head serving to close corresponding pairs of contacts.

Incidentally, it will be further appreciated that forming the members 91 and 92 of resilient, elongated conductive wire serves a variety of functions. Not only are the movable resilient members 92 flexed "out of" and "into" contact with the fixed resilient members 91 in accordance with the longitudinal position of the respective sensing probes, but it will be further apparent that due to the resiliency of the elements when contact is made, the fixed resilient members flex slightly with the movable members, thus effecting a "sliding" contact that prevents chattering. Moreover, when sensing head 19 is returned to the non-sensing position, the resiliency of the movable conductive members 92 will serve to urge the associated probe 88 back into position ready to sense the presence or absence of perforations in the next record. The spring wire members also can be very economically formed, and are well suited for making up compact multiple switch units such as the assembly 85.

For effecting relative movement between the probes 88 and the record 21, a drive is provided for urging the sensing head 19 downwardly against the bias of spring 82 when slide assembly 18 is positioned in sensing area 32. This drive includes a rotary solenoid 102 mounted within the base 16 and having an output shaft 103 (FIG. 2) carrying a crank head 104. A radial groove 105 is formed in the crank head 104 to receive the lower end of a sensing head actuating rod 106. The lower end of rod 106 is pinned to the head 104 by a pin 108 extending axially through the groove 105 in offset relation with respect to the axis of solenoid shaft 102. The upper end of the sensing head actuating rod is pinned to the horizontal portion 79 of the support member 78 by a pin 109 (see FIG. 3) thus effecting a pivotal connection between rod 106 and the sensing head. When the rotary solenoid 102 is energized, the crank head 104 is rotated through a predetermined arc to drive the actuating rod 106 and pull the sensing head 19 downwardly into sensing position.

As a feature of the invention, the rotary solenoid 102 is energized only when a record is properly oriented on the slide assembly 18 and the assembly is properly positioned in the sensing area 32. To this end, a slide responsive switch SRS (FIGS. 3 and 4) having an actuator $SRS_a$ is rigidly secured to the carrier plate 49 and interposed in the rotary solenoid energizing circuit (FIG. 11). A lug is rigidly secured to the slide assembly 18 and positioned to engage the switch actuator $SRS_a$ when the slide assembly is positioned in the sensing area 32.

Two additional normally open switches RSL and RSR having actuators $RSL_a$ and $RSR_a$ respective (FIG. 3), are rigidly mounted on the carrier plate 49, one on either side of the slide assembly 18. A pair of U-shaped elements 111 and 112 (FIGS. 3 and 4) having substantially horizontally disposed upper arms 114 and 115 respectively, and substantially horizontally disposed lower arms 116 and 118 respectively, are rigidly mounted on shaft 119, the ends of which are journaled in opposite side walls 50 and 51. A pair of springs 120, 121 (FIGS. 3 and 5), having one end connected to the lower arms 116, 118, respectively, and the other end connected to carrier plate 49 tend to urge the U-shaped elements 111 and 112 in a counterclockwise direction about the pivotal axis defined by the shaft 119. Counterclockwise movement of the U-shaped elements is limited by a pair of stops 122, 124 mounted on the carrier plate 49 and positioned to abut the lower arms 116, 118, respectively. The arms 116, 118 are provided with laterally extending tabs 125, 126, respectively, adjacent the mid-portions thereof and positioned to overlie the switch actuators $RSL_a$ and $RSR_a$, respectively. It will be evident that the springs 120, 121 will pivotally urge the U-shaped elements 111, 112, respectively, in a counterclockwise direction as viewed in FIGS. 3 and 5 with the tabs 125, 126 depressing the switch actuators $RSL_a$ and $RSR_a$, respectively. The upper arms 114, 115 of the U-shaped elements are provided with tapered cam surfaces 128, 129, respectively, at the forward extremities thereof.

From the foregoing it will be seen that as the slide assembly 18 moves rearwardly towards sensing area 32, it enters the U-shaped elements 111, 112. Assuming that a perforated film or record 21 is properly oriented on the lugs 40, 41, the cam portions 128, 129 on the upper arms 114, 115 of the U-shaped elements 111, 112, respectively, engage the record and ride up thereon thus tending to pivot the U-shaped elements in a clockwise direction. As the U-shaped elements pivot, the tabs 125, 126 move upwardly, thus releasing the switch actuators $RSL_a$ and $RSR_a$ respectively, to close the normally open switches RSL and RSR. If no film is present on the slide assembly, the U-shaped elements will not be pivoted and the switches will remain open. Moreover, if the perforated record is improperly oriented on the slide assembly, one or both of the U-shaped elements will not be pivoted. Thus, the circuit for energizing the solenoid 102 is not completed unless the slide assembly 18 is in sensing position to close switch SRS and the record is properly oriented to close switches RSL, RSR.

To insure accurate sensing of the perforation field 26, the slide assembly is properly oriented and latched in the sensing area 32 (FIG. 1) as an incident to the sensing movement of the head 19. This is accomplished by forming an enlarged opening 130 (FIG. 5) in the record support plate 38 positioned to receive a pin 131 rigidly mounted on the support assembly 85 that form a part of the sensing head 19. The pin 131 is provided with a rounded lower tip 132 which pilots into the opening 130 and cams the sensing head 19 laterally to correct for any slight misalinement between the sensing head 19 and slide assembly 18. It will be apparent that when the rotary solenoid 102 is energized and the sensing head 19 is pulled downwardly by the actuating rod 106, the pin 131 will enter the opening 130 in the record support plate 38, tending first to properly orient the sensing head with respect to the slide assembly, and second, to lock the slide assembly in the sensing area.

In order to prevent arcing and thereby increase the life of the conductive members $91a$–$91e$ and $92a$–$92e$, provision has been made for maintaining these members conductive until after the contacts thereon have been opened or closed in accordance with the presence or absence of a perforation at each of the stations in the perforated record. In the particular device illustrated this is accomplished by providing a normally open head down switch HDS (FIGS. 3 and 5) responsive to the vertical position of the sensing head 19. The head down switch HDS is mounted on the bracket 59 and is provided with an actuator $HDS_a$ positioned to be enaged and depressed by an adjustable pin 135 mounted on the underside of the substantially horizontal portion 79 of the support member 78. The pin 135 is adjusted so that it will engage and depress the actuator $HDS_a$ immediately after the probes $88a$–$88e$ have sensed the presence or absence of perforations in the record. That is to say, during the initial portion of the downward movement of the sensing head 19, probes $88a$–$88e$ will detect the presence or absence of perforations at their respective stations and, in accordance therewith, will precondition the plurality of switching members $91a$–$91e$ and $92a$–$92e$. During the latter portion of the downward movement of sensing head 19 and after the switching members have been preconditioned, the adjustable pin 135 engages the actuator $HDS_a$ to close the normally open head down switch HDS.

To restore the sensing head 19 to a non-sensing position while simultaneously returning the slide assembly to the loading area 32 (FIG. 1), a normally closed "read complete" switch RCS is provided with the data processor with which the present apparatus 15 is to be used. This switch has been schematically illustrated in FIG. 11 as a part of the sensing head energizing circuit. The "read complete" switch RCS may either be physically connected to the perforation sensing apparatus 15 of the present invention or to the data processor with which this apparatus is to be used. When the data processor has received all of the information sensed by the sensing head, the normally closed "read complete" switch RCS opens and the rotary solenoid 101 is deenergized, thus allowing the sensing head to move in a clockwise direction to a non-sensing position.

Turning now to FIG. 11, the control circuit for the present machine will be briefly summarized in conjunction with the operation of the machine. Assuming that slide assembly 18 is in the loading area 31 (FIG. 1), it will be apparent that all of the sensing contacts $98a$–$98e$, $99a$–$99e$, and the "read complete" switch RCS are normally closed. Slide responsive switch SRS, record sensitive switches RSL and RSR and head down switch HDS are all normally open. It will further be seen that each of the movable resilient conductive switch elements $92a$–$92e$ is connected to a load responsive device, $136a$–$136e$ respectively, on a data processor or the like, as indicated by dotted lines $137a$–$137e$. When a perforated record, for example the film strip 21 disclosed in FIG. 12 is properly oriented on the slide assembly 18, the locator lugs 39, 40 project upwardly through the locator openings 29, 30 respectively in the film strip. The operator then moves the slide assembly rearwardly towards the sensing area 32 (FIG. 1). As the assembly is translated rearwardly, it enters the U-shaped elements 111, 112 (FIG. 3), thus actuating switches RSL and RSR to close the normally open contacts $RSL_{c1}$, $RSL_{c2}$ and $RSR_{c1}$ and $RSR_{c2}$, respectively. Further rearward movement of the slide assembly subsequently causes normally open contacts $SRS_{c1}$ and $SRS_{c2}$ to close when switch actuator $SRS_{c1}$ is depressed by the lug 110 on the slide assembly. When the normally open switches RSL, RSR and SRS are all closed, rotary solenoid 102, which is connected to a suitable A.-C. source, is energized, thus imparting limited rotational movement to the solenoid output shaft 103 (FIG. 2). The limited rotational movement of shaft 103 is imparted to crank head 104 and to the eccentrically mounted sensing head actuating rod 106, thus tending to pull the sensing head 19 downwardly towards the slide assembly 18. The pin 131 on the sensing head enters the opening 130 in the slide assembly as shown in FIG. 5, thus orienting the slide with respect to the head and locking the slide in position. As the sensing head moves downwardly, the probes $88a$–$88e$ tend to enter the openings, or stations, 35 formed in the raised portion 36 of record support plate 38. Since certain of the openings 35 will be blocked by the unperforated portion of the record 21 while the remainder of the openings 35 will be registered with the perforations 28 in the record, only those probes $88a$–$88e$ sensing a perforation 28 will move into registration with openings 35. The remainder of the probes will be impeded by the unperforated portion of the record and hence will cease moving downwardly, thus effectively moving upwardly relative to the downwardly moving sensing head 19. It will be apparent therefore, that during the initial portion of the downward movement of sensing head 19, certain of the probes, i.e., those sensing no perforation, will be impeded and hence will flex the corresponding elongated conductive members $92a$–$92e$ upwardly, thereby "breaking" the corresponding normally closed contacts $98a$–$98e$, $99a$–$99e$. Having preconditioned the sensing contacts in accordance with the presence or absence of a perforation 28 in the record 21, continued downward movement of the sensing head 19 serves to close the normally open head down switch HDS (FIG. 5), thus rendering the closed sensing contacts conductive and energizing those of the load responsive devices $136a$–$136e$ which correspond to the probes $88a$–$88e$ that have sensed the presence of a perforation.

When the information relayed by the sensing head 19 has been received by a data processor or the like, the normally closed "read complete" switch RCS opens, thus deenergizing the rotary solenoid 102. When the solenoid is deenergized, the sensing head 19 moves in a clockwise direction as viewed in FIG. 3 under the influence of the spring 82 causing the guide and locking pin 131 to be withdrawn from the opening 130 in the record support plate 38. The clock spring 58 then tends to rewind, thus automatically translating the slide assembly 18 from the sensing area 32 towards the loading area 31 (FIG. 1).

Due to the inertial forces of the slide assembly 18, the plate 38 and record 21 will move through the loading area 31 to the ejection area 34. As the slide assembly 18 passes through the loading area, the depending lug 74 (FIG. 7) on the ejector mechanism 20 engages the stop 75 on the carrier plate 49, thus causing the ejector plate 70 and arms 71, 72 to pivot about the axis of the shaft 68 in a counterclockwise direction. As the arms pivot they engage the underside of the record 21 and strip the record from the locating lugs 39, 40. The spring biased plungers 65, 66 then return the slide assembly 18 to the loading area 31 (FIG. 1) in readiness for reception of another record preparatory to commencing another sensing cycle.

It will be apparent that a perforation sensing and reading apparatus made in accordance with this invention is extremely compact and capable of sensing coded indicia in the form of perforations at very close stations in a predetermined array. Since the contact pairs are made of flexible spring wires, they are economically formed while at the same time being particularly well suited for use in a compact multiple switching arrangement of the type disclosed. The apparatus automatically steps through a complete operating cycle, requiring an operator only for loading the perforated record and for moving the slide assembly towards the sensing area.

We claim as our invention:

1. In a device for reading patterns of perforations disposed at closely adjacent stations in a rectangular array on a record, the combination comprising, a base having a loading area and a sensing area, a plate mounted on said base for supporting said record and translatable with respect to the base between said loading area and said sensing area, said plate having a plurality of openings therein arranged at closely adjacent stations in a rectangular array, means on said plate for alining said stations in said record with the stations in said plate, means mounted on said base for sensing the presence or absence of a record on said plate when said plate is positioned within said sensing area, a support head carried by said base and relatively movable with respect to said plate, means carried by said head with freedom for longitudinal movement relative thereto for determining the presence or absence of perforations at each of said alined stations, power means carried by said base for effecting relative closing movement between said head and said plate only when said plate is positioned within said sensing area, and means controlled by said sensing means for rendering said power means effective for causing relative movement between said head and said plate only when the presence of a record on said plate is detected.

2. In a device for reading patterns of perforations disposed at closely adjacent stations in a rectangular array on a record, the combination comprising, a base having a loading area and a sensing area, a plate mounted on said base for supporting said record and translatable with respect to the base between said loading and said sensing areas, said plate having a plurality of openings therein arranged at closely adjacent stations in a rectangular array, means on said plate for alining the stations in said record with the stations in said plate, a support head carried by said base and relatively movable with respect to said plate, power means effecting relative closing movement between said head and said plate only when said plate is within said sensing area, means carried by said head for sensing the presence or absence of perforations in said record at each of said alined stations when said plate is in said sensing area, and means carried by said base for inactivating said power means when the stations in said record are misalined with respect to the stations in said plate.

3. In a device for reading patterns of perforations disposed at closely adjacent stations in a rectangular array on a record, the combination comprising, a base having a loading area and a sensing area, a plate mounted on said base for supporting said record and translatable with respect to said base between said loading and sensing areas, a spring mounted on said base for biasing said plate towards said loading area, said plate having a plurality of openings therein arranged at closely adjacent stations in a rectangular array, means on said plate for alining the stations in said record with the stations in said plate, a support head carried by said base and relatively movable with respect to said plate, a plurality of closely adjacent parallel, elongated probes arranged in a rectagnular array carried by said head with freedom for longitudinal movement relative thereto, means responsive to the position of said plate for effecting relative closing movement between said head and said plate only when said plate is in said sensing area, and electrical means carried by said head responsive to the longitudinal position of each of said parallel probes for indicating the presence or absence of a perforation at each of the stations in said record when said head and plate are moved relatively towards each other.

4. In a device for reading patterns of perforations disposed at closely adjacent stations in a rectangular array on a record, the combination comprising, a base having a loading area and a sensing area, a plate mounted on said base for supporting said record and translatable with respect thereto between said loading and sensing areas, said plate having a plurality of openings therein arranged at closely adjacent stations in a rectangular array, said record having locating apertures therein, said plate having locating lugs formed thereon and positioned to register with said apertures for alining the stations in said record with the stations in said plate, means mounted on said base for biasing said plate towards said loading area, a support head mounted on said base for relative closing movement with respect to said plate, means carried by said head for sensing the presence or absence of perforations in said record at each of said alined stations, means carried by said base for effecting relative closing movement between said plate and said head when said plate is positioned in said sensing area, means formed on said head and said plate for latching said plate in said sensing area, and means for releasing said latching means when said sensing means have determined the presence or absence of a perforation at each of said alined stations whereby said plate will be automatically returned to said loading area by said biasing means.

5. In apparatus for reading patterns of perforations disposed at closely adjacent stations in a row on a record, the combination comprising, a base having a loading area, a sensing area and an ejecting area; means for supporting said record mounted on said base and translatable between each of said areas, a sensing head mounted on said base in proximity to said sensing area for relative movement with respect to said base, closely spaced, parallel sensing probes carried by said head for relative longitudinal movement with respect thereto, means mounted on said base for urging said record supporting means toward said loading area with limited overtravel movement of said record supporting means relative to said loading area so as to momentarily position said record supporting means in said ejecting area, and means having an arm positioned to underlie said record in said loading area pivotally mounted on said apparatus for stripping said record from said supporting means when said last named means is in said ejecting area and as an incident to said limited overtravel movement.

6. In an apparatus for sensing perforations in a record, the combination comprising, a base having a loading and sensing area, a mounting plate disposed on said base and translatable with respect to the base between said loading and sensing areas, means for orienting said record in a predetermined position on said plate at said loading area, means positioned in proximity to said sensing area for sensing the presence or absence of perforations in said record, means for returning said plate and record to said loading area with limited over-travel of said plate and record with respect to said loading area during the return of the plate, an ejector mechanism pivotally mounted on said apparatus and having an arm positioned to underlie said record when said record is mounted on said plate in said loading area, and means mounted on said plate and base for pivoting said ejector mechanism about its pivot during said limited over-travel whereby said arm is momentarily tilted upwardly to engage the underside of said record for ejecting said record from said plate and orienting means.

7. In an apparatus for sensing perforations in a record, the combination comprising, a base having a loading area and a sensing area, a mounting plate disposed on said base and translatable with respect to the base between said loading area and said sensing area, said record having a plurality of enlarged locating openings formed therein, said plate having a plurality of upstanding locating pins corresponding to said openings and positioned to pass through said openings for orienting said record in a predetermined position on said plate at said loading area, means positioned in proximity to said sensing area for sensing the presence or absence of perforations in said record, means for returning said plate and record to said loading area with a limited amount of over-travel of said plate and record with respect to said loading area during said return, an ejector mechanism pivotally mounted on said slide assembly having a depending lug thereon, and a stop mounted on said base positioned to engage said lug during said limited over-travel whereby said arm is pivoted upwardly to strip said record from said locating pins.

8. In an apparatus for sensing perforations in a record, the combination comprising, a base having a loading area and a sensing area, a slide assembly disposed on said base and translatable with respect to the base between said loading area and said sensing area, means on said slide assembly for orienting said record in a predetermined position with respect to said slide assembly at said loading area, spring means mounted on said base and cooperating with said slide assembly to urge said assembly towards said loading area, means positioned in proximity to said sensing area for sensing the presence or absence of perforations in said record, said sensing means and slide assembly including means for latching said assembly in said sensing area, mean for automatically releasing said latching means when said sensing means has determined the presence or absence of perforations in said record, an ejector mechanism pivotally mounted on said slide assembly and having a depending lug formed thereon, a stop positioned on said base, and means positioned on said base allowing said slide assembly to move through said loading area with a limited amount of over-travel under the inertial forces imposed by said spring whereby during said over-travel said lug engages said ejector mechanism to cause said arm to momentarily tilt upwardly and engage said record for stripping said record from said slide assembly.

9. In an apparatus for sensing perforations in a record, the combination comprising, a base having a loading area, a sensing area and an ejecting area, a slide assembly disposed on said base and translatable with respect to the base between said ejecting area and said sensing area and through said loading area, means for orienting said record in a predetermined position on said slide assembly at said loading area, spring means mounted on said base for urging said slide assembly towards said loading area, means positioned in proximity to said sensing area for sensing the presence or absence of perforations in said record, means for latching said slide assembly in said sensing area, means for automatically releasing said latching means when said sensing means has determined the presence or absence of said perforations in said record, cushioning means mounted on said base and positioned to allow a limited amount of over-travel of said slide assembly under the forces exerted by said spring when said latching means are released, an ejector mechanism pivotally mounted on said slide assembly and having an arm positioned to underlie said record, said mechanism having a depending lug formed thereon, and a stop mounted on said base and positioned to cooperate with said lug when said slide assembly is in said ejecting area whereby said lug is driven into engagement with said stop when said slide assembly is released for momentarily tilting said arm to strip said record from said slide assembly.

10. In a device for automatically ejecting a perforated record from a perforation sensing apparatus, said apparatus of the type having a loading area and a sensing area with a record supporting slide translatable between said areas and means for urging said slide from the sensing area towards the loading area with a limited amount of over-travel, the combination comprising, an ejector mechanism pivotally mounted on said apparatus having an arm positioned to underlie said record when said record is mounted on said slide in said loading area, and means mounted on said apparatus for pivoting said ejector mechanism about its pivot during said limited over-travel whereby said arm is momentarily tilted upwardly to engage the underside of said record for stripping said record from said slide.

References Cited by the Examiner

UNITED STATES PATENTS

| 769,124 | 8/1904 | Wood | 271—70 |
|---|---|---|---|
| 956,193 | 4/1910 | Scott | 271—70 |
| 2,704,186 | 3/1955 | Braun | 235—61.11 |
| 2,866,598 | 12/1958 | Balde | 235—61.11 |
| 2,883,107 | 4/1959 | Domizi | 235—61.11 |
| 2,889,984 | 6/1959 | Gruver | 235—61.11 |
| 2,980,319 | 4/1961 | Clemens et al. | 234—30 |

MALCOLM A. MORRISON, *Primary Examiner.*

CORNELIUS ANGEL, *Examiner.*